US012429186B2

(12) United States Patent
Kappelhoff

(10) Patent No.: US 12,429,186 B2
(45) Date of Patent: Sep. 30, 2025

(54) LIGHTING DEVICE FOR VEHICLES

(71) Applicant: HELLA GMBH & CO. KGAA, Lippstadt (DE)

(72) Inventor: Martin Kappelhoff, Bad Sassendorf (DE)

(73) Assignee: HELLA GMBH & CO. KGAA, Lippstadt (DE)

(*) Notice: Subject to any disclaimer, the term of this patent is extended or adjusted under 35 U.S.C. 154(b) by 0 days.

(21) Appl. No.: 18/770,237

(22) Filed: Jul. 11, 2024

(65) Prior Publication Data

US 2025/0020301 A1 Jan. 16, 2025

(30) Foreign Application Priority Data

Jul. 14, 2023 (DE) ......................... 102023118676.0

(51) Int. Cl.

*F21S 41/33* (2018.01)
*F21S 41/20* (2018.01)
*F21S 41/25* (2018.01)
*F21S 41/36* (2018.01)
*F21S 43/20* (2018.01)
*F21S 43/33* (2018.01)
(Continued)

(52) U.S. Cl.

CPC ............. *F21S 41/337* (2018.01); *F21S 41/25* (2018.01); *F21S 41/2805* (2024.05); *F21S 41/36* (2018.01); *F21S 43/2651* (2024.05); *F21S 43/332* (2024.05); *F21S 43/401* (2024.05); *F21W 2103/60* (2018.01)

(58) Field of Classification Search

CPC .......... F21S 41/337; F21S 41/25; F21S 41/36; F21S 43/332; F21S 43/2651; F21S 43/401; F21W 2103/30
See application file for complete search history.

(56) References Cited

U.S. PATENT DOCUMENTS 6,471,380 B1 10/2002 Henneboehle et al.
2013/0343075 A1* 12/2013 Schirmer ................ F21S 43/31 362/516
(Continued)

FOREIGN PATENT DOCUMENTS

DE 1093685 B 11/1960
DE 2214161 A1 9/1973
DE 19940410 A1 3/2001
(Continued)

OTHER PUBLICATIONS

Innovation Q+ NPL Search (Year: 2024).*

*Primary Examiner* — Anabel Ton
(74) *Attorney, Agent, or Firm* — WARNER NORCROSS + JUDD LLP

(57) ABSTRACT

This invention relates to a lighting device for vehicles having a housing, which is arranged in a corner region of a vehicle, having a light-permeable lens which closes off an opening of the housing, wherein a light module with a light source and with an optical unit for generating a predetermined light distribution is arranged in the housing and wherein a side marker reflex reflector extending in the main beam direction of the lighting device and containing reflex reflector elements for side marking of the vehicle is arranged in the housing, wherein the side marker reflex reflector is arranged in main beam direction behind at least a part of the light module.

15 Claims, 1 Drawing Sheet

(51) Int. Cl.
*F21S 43/40* (2018.01)
*F21W 103/60* (2018.01)

(56) References Cited

U.S. PATENT DOCUMENTS

| | | | | |
|---|---|---|---|---|
| 2017/0276843 A1* | 9/2017 | Hohmann | ................ | G02B 5/32 |
| 2021/0213867 A1* | 7/2021 | Kratzer | ................ | F21S 41/275 |

FOREIGN PATENT DOCUMENTS

| | | | | | |
|---|---|---|---|---|---|
| DE | 29924663 | U1 * | 10/2004 | .............. | F21S 43/26 |
| DE | 102009058458 | A1 | 7/2011 | | |
| EP | 3839328 | A1 | 6/2021 | | |
| JP | 2002216504 | A * | 8/2002 | | |
| KR | 20130136105 | A | 12/2013 | | |

* cited by examiner

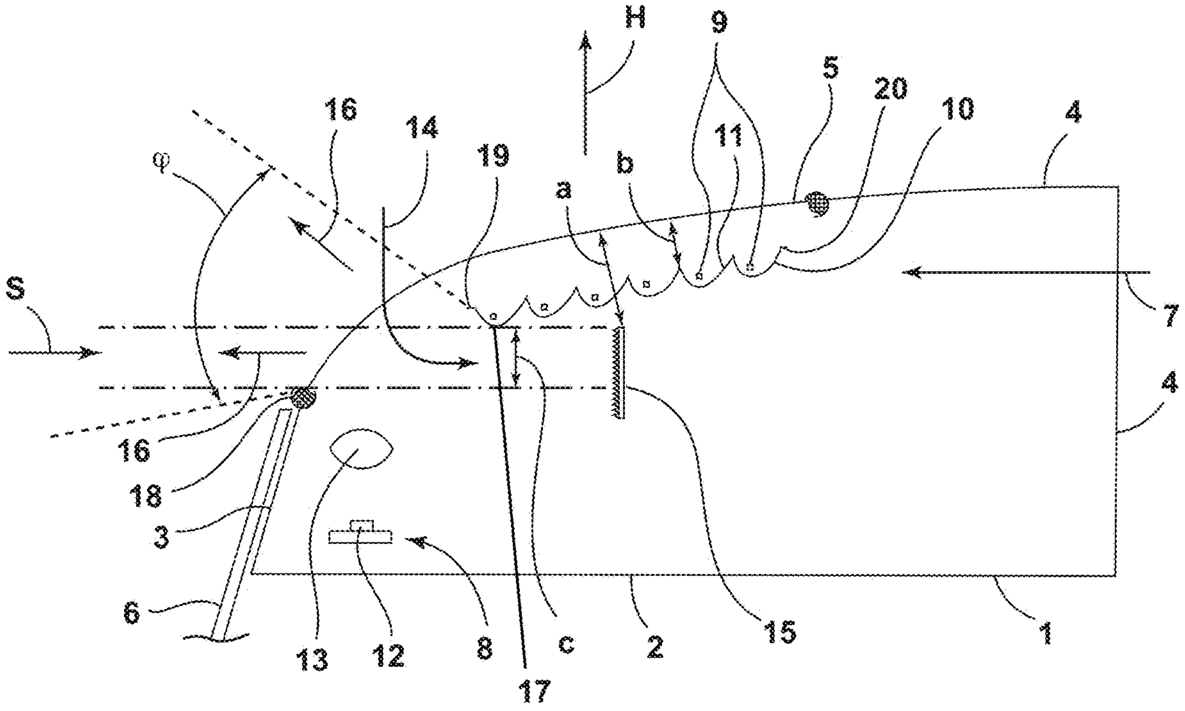
H
9
5
20
10
4
16
14
19
11
a
b
φ
S
7
4
16
18
3
6
13
12
8
c
2
15
1
17

LIGHTING DEVICE FOR VEHICLES

CROSS-REFERENCE TO RELATED APPLICATIONS

The present application claims the benefit of German Patent Application No. 10-2023-118-676.0, filed Jul. 14, 2023, the disclosure of which is incorporated by reference.

BACKGROUND OF THE INVENTION

The invention relates to a lighting device for vehicles having a housing, which is arranged in a corner region of a vehicle, having a light-permeable lens which closes off an opening of the housing, wherein a light module with a light source and with an optical unit for generating a predetermined light distribution is arranged in the housing and wherein a side marker reflex reflector extending in the main beam direction of the lighting device and containing reflex reflector elements for side marking of the vehicle is arranged in the housing.

EP3839328A1 discloses a lighting device for vehicles having a housing in which is integrated a light module containing a light source and an optical unit. A reflex reflector is arranged in the main beam direction in front of the light module.

KR20130136105A discloses a lighting device for vehicles having a housing in which is integrated a side marker light function. A light source and a light conductor with corresponding light decoupling elements are provided for this purpose.

DE19940410A1 discloses a lighting device for vehicles having a housing in which a first light module and a second light module are arranged. The two light modules each have a light source and an optical unit for generating a corresponding light distribution. A partition wall between the light modules, which is connected to the front in the main beam direction as an extension of a side panel of one of the light modules, is configured as a side marker reflex reflector. A disadvantage of the known lighting device is that the side marker reflex reflector is recognizable from a front viewing direction.

The task of the present invention is to further develop a lighting device for vehicles with an integrated side marker reflex reflector in such a way that the side marker reflex reflector is not visible, in particular from a front viewing angle of the lighting device.

SUMMARY OF THE INVENTION

To solve this task, the invention is characterized in that the side marker reflex reflector is arranged in the main beam direction behind at least a part of the light module.

The particular advantage of the invention is that the side marker reflex reflector is not recognizable from a front side of the lighting device, so that the appearance of the lighting device is substantially characterized by the formation of one or more light modules. The basic idea of the invention is to arrange the side marker reflex reflector behind a light module in such a way that it cannot be seen from the front. The side marker reflex reflector is only recognizable to an observer from a side region that runs perpendicular to the main beam direction of the lighting device. Preferably, the viewing angle for the viewer for the recognizability or alternatively visibility of the side marker reflex reflector coincides with an angle range or alternatively opening angle range, according to which the light from the side marker reflex reflector is reflected back laterally to the outside through a lens of the lighting device and passes through the lens. In this way, the viewing angle range of the side marker reflex reflector for a person is not larger than an opening angle range of the side marker reflex reflector for the realization of its signal light function.

According to a further development of the invention, a distance of the side marker reflex reflector to a lens is greater than a distance of the light source and/or a component of the optical unit of the light module to the lens. In conjunction with the rear arrangement of the side marker reflex reflector relative to the light module, it is hereby ensured that the side marker reflex reflector can only be seen from the side and not from a front side.

According to a further development of the invention, the housing of the lighting device is arranged in a swept-back configuration with a lens extending at an angle to the main beam direction as well as a light module preferably extending diagonally. If the side marker reflex reflector is projected onto the light module or alternatively the lens in the main beam direction, the side marker reflex reflector runs between a left end of the light module in the main beam direction and a right end of the same or alternatively left end of the lens or alternatively right end of the lens. This ensures that the side marker reflex reflector is not recognizable at all from the front and is only from the side in an acute angle range. The laterally acute angle range at which the side marker reflex reflector is visible to an observer is dependent on a distance of the side marker reflex reflector to a rear end of the light module and an edge of the lens as well as a width of a side opening, the width of which side opening is determined by a perpendicular projection of the rear end of the light module and the rear edge of the lens.

According to a further development of the invention, the housing has a rear panel as well as a short side panel and a long side panel. The short side panel covers a second light module. The side opening extends between the first light module and the second light module. The first and second light modules are arranged next to one another in projection along the main beam direction. Only in a projection perpendicular to the main beam direction are the first and second light modules arranged at a distance corresponding to a width of the side opening. Advantageously, the already existing installation space of the housing between the short side panel and the long side panel can be used to accommodate the side marker reflex reflector.

According to a further development of the invention, a distance of the side marker reflex reflector to the lens and/or the distance of the first light module to a second light module in the main beam direction limiting the back beam elements and/or a side opening is selected such that light entering through the lens and striking the side marker reflex reflector emerges from the lens in a vertical opening angle range of at least +/−5° and in a horizontal opening angle range of at least +/−20°. In this way, a legally prescribed opening angle range with an upper and lower limiting angle or alternatively front and rear limiting angle range is maintained.

BRIEF DESCRIPTION OF THE DRAWING

An embodiment example of the invention is elucidated in more detail below with reference to the drawing, in which:

FIG. 1 shows a horizontal cross-section through a lighting device.

DETAILED DESCRIPTION OF THE CURRENT EMBODIMENT

The invention will be further described by means of an exemplary embodiment with reference to FIG. 1. A lighting device for vehicles can, for example, be arranged as a headlight in a front region of the vehicle or as a rear light at the rear end of the vehicle. In the present embodiment example, a preferably pot-shaped housing 1 is provided with a rear panel 2 at the rear in main beam direction H, with a short side panel 3 and with a long side panel 4. One opening of the housing 1 is closed by a transparent lens 5.

The lens 5 is configured as a swept-back lens 5, which forms an acute angle to the main beam direction H. The lighting device shown in the FIG. is arranged in a front left-hand region of the vehicle, so that the long side panel 4 of the housing 1 is arranged facing the longitudinal center plane of the vehicle and the short side panel 3 is arranged on a side of the housing 1 facing away from the longitudinal center plane of the vehicle. The short side panel 3 of the housing 1 extends substantially parallel to a body component 6 of the vehicle, the opening of which body component is covered by the lens 5. The main beam direction H runs in the direction of a longitudinal centerline of the vehicle.

A first light module 7 is arranged in a front region of the housing 1 and a second light module 8 is arranged in a rear region of the housing 1.

The first light module 7 is used to generate a daytime running light distribution. The first light module 7 comprises a number of light sources 9 and an optical unit 10. The optical unit 10 has a plurality of reflector surfaces 11 respectively assigned to the light sources 9.

The second light module 8 comprises a light source 12 and an optical unit 13, wherein the optical unit 13 is formed by a lens arrangement. The second light module 8 is used, for example, to generate a low beam distribution or a main light distribution.

The second light module 8 is arranged in a lateral direction S running perpendicular to the main beam direction H, concealed by the short side panel 3 of the housing 1 or alternatively, when installed, by the body component 6 and cannot be seen.

When the first light module 7 and the second light module 8 are projected in a plane extending perpendicular to the main beam direction H, the first light module 7 and the second light module 8 are arranged next to one another. The second light module 8 is thus arranged laterally in the main beam direction H and offset to the first light module 7 perpendicular to the main beam direction H.

In the main beam direction H, the second light module 8 is arranged at a distance from the first light module 7, resulting in a side opening 14. The side opening 14 has a width c, which substantially runs in main beam direction H. The side opening 14 is covered by part of the lens 5 in the projection of the side opening 14 in a lateral direction S running perpendicular to the main beam direction H. The side opening 14 thus results from the offset arrangement of the first light module 7 relative to the second light module 8 in the main beam direction H. This intermediate space formed by the side opening 14 is used for the arrangement of a side marker reflex reflector 15, which serves to mark the side of the vehicle. If another road user turns in from the lateral direction S or against the direction of travel of the vehicle, the light emitted by the lighting device of the other road user enters the side opening 14 of the housing 1 through the lens 5, is reflected by the side marker reflex reflector 15, and then exits the housing 1 again through the lens 5 at an opening angle φ. The opening angle φ is dependent on the arrangement of the side marker reflex reflector 15 in relation to the first light module 7 and/or to the lens 5.

In the present embodiment example, the side marker reflex reflector 15 is configured as a light panel that is colored yellow. The side marker reflex reflector 15 has prismatic elements as reflex reflective elements, so that the light 16 entering the side opening 14 through the lens 5 is reflected in a scattered manner.

In the present embodiment example, the first light module 7—like the lens 5—runs swept-back at an oblique angle to the main beam direction H. The side marker reflex reflector 15 is arranged in the main beam direction H behind at least part of the first light module 7, which is to say, at least behind a half of the first light module 7 facing the longitudinal center axis of the vehicle. As can be seen from the FIG., a distance a of the side marker reflex reflector 15 to the lens 5 is greater than a distance b of the first light module 7 and/or a component (light source 9, reflector surface 11) of the first light module 7 to the lens 5.

In the present embodiment example, the side marker reflex reflector 15 extends in the main beam direction H and in a vertical direction. The side marker reflex reflector 15 is located at a distance from a rear side of the first light module 7. In the present embodiment example, the side marker reflex reflector 15 is projected in a plane perpendicular to the main beam direction H and is arranged approximately centrally with respect to the first light module 7. A front end of the side marker reflex reflector 15 thus comprises a distance to an end of the first light module 7 facing away from a longitudinal center plane of the vehicle and a distance to an end of the first light module 7 facing the longitudinal center plane of the vehicle. When projected onto the first light module 7 in the main beam direction H, the side marker reflex reflector 15 extends substantially in a central region of the first light module 7 between a left end 19 and a right end 20 of the first light module 7 as seen in main beam direction H.

When projected in lateral direction S, the side marker reflex reflector 15 intersects a rear end 17 of the first light module 7 or falls into line with the same. A front end of the side opening 14 is thus delimited by the rear end 17 of the first light module 7. A rear end of the side opening 14 is delimited by an edge of the short side panel 3 and/or a rear edge 18 of the lens 5. This results in a depicted horizontal aperture angle range φ of the side marker reflex reflector 15 (side marker reflex reflector function), which amounts to at least +/−20°. A vertical aperture angle range of the side marker reflex reflector 15 (side marker reflex reflector function) that is not shown amounts to at least +/−5° with an installation height of the lighting device in the vehicle of at least 750 mm or at least +/−10° with a lower installation height.

The vertical and horizontal opening angle range φ of the side marker reflex reflector 15 corresponds to a viewing angle range for an outside observer. The side marker reflex reflector 15, which is undesirable for design reasons, is therefore only detected from the lateral direction S, wherein the viewing angle is not greater than the minimum opening angle range specified for the side marker light function.

According to an alternative embodiment of the invention that is not shown, the lighting device can comprise solely the first light module 7 as the only light module. The housing depth in main beam direction H can thus be configured to be smaller.

According to an alternative embodiment of the invention, the second light function can also be designed as a design element instead of a second light module.

LIST OF REFERENCE NUMERALS

1 housing
2 rear panel

3 short side panel
4 long side panel
5 lens
6 body component
7 1st light module
8 2nd light module
9 light source
10 optical unit
11 reflector surface
12 light source
13 optical unit
14 side opening
15 side marker reflex reflector
16 light
17 rear end
18 rear edge
19 left end
20 right end
H main beam direction
a, b distance
c width
S lateral direction
φ horizontal aperture angle range The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A lighting device for a vehicle, the lighting device comprising:
- a housing arranged in a corner region of the vehicle;
- a light-permeable lens which closes off an opening of the housing;
- a light module with a light source and an optical unit for generating a predetermined light distribution arranged in the housing;
- a side marker reflex reflector extending in a main beam direction of the lighting device and being arranged in the housing;
- wherein the side marker reflex reflector includes a plurality of reflex reflector elements for side marking of the vehicle; and
- wherein the side marker reflex reflector extends in the main beam direction behind at least a portion of the light module, the side marker reflex reflector being located behind a rear side of the optical unit of the light module, such that the side marker reflex reflector is not visible from a front viewing direction when facing the light module.

2. The lighting device of claim 1, wherein a distance of the side marker reflex reflector to the lens is greater than a distance of the light module or a component thereof to the lens.

3. The lighting device of claim 1, wherein the side reflex marker reflector reflects in a lateral direction that runs perpendicular to the main beam direction.

4. The lighting device of claim 1, wherein the optical unit of the light module extends at an acute angle relative to the main beam direction.

5. The lighting device of claim 1, wherein the side marker reflex reflector extends in the main beam direction and is disposed between a first end of the light module and a second end of the light module.

6. The lighting device of claim 5, wherein the side marker reflex reflector extends in the main beam direction on the light module in a central region between the first end of the light module and the second end of the light module.

7. The lighting device of claim 1, wherein the side marker reflex reflector is perpendicular to the main beam direction and intersects the rear end of the light module.

8. The lighting device of claim 1, wherein the lens extends at an acute angle oblique to the main beam direction, and wherein the light module and the side marker reflex reflector are covered by the lens.

9. The lighting device of claim 1, wherein the housing comprises a rear panel, a short side panel projecting from an edge of the rear panel, and a long side panel projecting from the edge of the rear panel, wherein the lens extends from an edge of the short side panel to an edge of the long side panel.

10. A lighting device for a vehicle, the lighting device comprising:
- a housing arranged in a corner region of the vehicle;
- a light-permeable lens which closes off an opening of the housing;
- a light module with a light source and an optical unit for generating a predetermined light distribution arranged in the housing;
- a side marker reflex reflector extending in a main beam direction of the lighting device and being arranged in the housing;
- wherein the side marker reflex reflector includes a plurality of reflex reflector elements for side marking of the vehicle;
- wherein the side marker reflex reflector extends in the main beam direction behind at least a portion of the light module;
- wherein the housing comprises a rear panel, a short side panel projecting from an edge of the rear panel, and a long side panel projecting from the edge of the rear panel, wherein the lens extends from an edge of the short side panel to an edge of the long side panel; and
- wherein the light module is a first light module, and wherein a second light module is arranged in a rear region of the housing, and wherein the second light module is laterally covered by the short side panel.

11. The lighting device of claim 10, wherein the side marker reflex reflector is oriented to reflect light in direction that is perpendicular to the main beam direction between the first light module and the second light module.

12. A lighting device for a vehicle, the lighting device comprising:
- a housing arranged in a corner region of the vehicle;
- a light-permeable lens which closes off an opening of the housing;
- a light module with a light source and an optical unit for generating a predetermined light distribution arranged in the housing;
- a side marker reflex reflector extending in a main beam direction of the lighting device and being arranged in the housing;
- wherein the side marker reflex reflector includes a plurality of reflex reflector elements for side marking of the vehicle;
- wherein the side marker reflex reflector extends in the main beam direction behind at least a portion of the light module; and wherein a distance from the side marker reflector to the lens is configured such that light entering through the lens and striking the side marker reflex reflector emerges at the lens in a vertical aperture angle range of at least +/−5° and in a horizontal aperture range of at least +/−20°.

13. The lighting device of claim 1, wherein the side marker reflex reflector is colored yellow.

14. The lighting device of claim 1, wherein the reflex reflector elements of the side marker reflex reflector are prismatic elements.

15. The lighting device of claim 10, wherein the first light module is used to generate a daytime running light function and wherein the second light module is used to generate a main light function or a low beam function.

* * * * *